United States Patent [19]

Robertson et al.

[11] Patent Number: 4,616,336

[45] Date of Patent: Oct. 7, 1986

[54] INDEPENDENT IMAGE AND ANNOTATION OVERLAY WITH HIGHLIGHTING OF OVERLAY CONFLICTS

[75] Inventors: David B. Robertson, Round Rock; Stephen A. Wagh, Austin, both of Tex.; Mary F. Piller, Baltimore; Donald T. Crehan, Gaithersburg, both of Md.; Charles J. Lovell, Austin, Tex.

[73] Assignee: International Business Machines Corp., Armonk, N.Y.

[21] Appl. No.: 493,581

[22] Filed: May 11, 1983

[51] Int. Cl.[4] .................. G06F 15/00; G06F 3/14; G06G 1/06
[52] U.S. Cl. .................. 364/900; 364/521; 340/721; 340/723; 340/745
[58] Field of Search .............. 364/200, 900 MS File, 364/518, 519, 520, 521; 340/721, 722, 723, 724, 732, 734, 745, 748, 749; 400/63, 68

[56] References Cited

U.S. PATENT DOCUMENTS

| | | | |
|---|---|---|---|
| 3,821,730 | 6/1974 | Carey et al. | 340/324 AD |
| 4,317,114 | 2/1982 | Walker | 340/721 |
| 4,435,779 | 3/1984 | Mayer et al. | 364/900 |
| 4,441,105 | 4/1984 | Van Vliet et al. | 340/750 |
| 4,470,129 | 9/1984 | Disbrow et al. | 364/900 |
| 4,491,832 | 1/1985 | Tanaka | 340/721 |
| 4,495,491 | 1/1985 | Postl | 340/709 |
| 4,498,079 | 2/1985 | Ghosh et al. | 340/721 X |
| 4,498,081 | 2/1985 | Fukushima et al. | 340/721 X |
| 4,517,654 | 5/1985 | Carmean | 364/521 |
| 4,517,658 | 5/1985 | Iida | 364/900 |
| 4,528,561 | 7/1985 | Kitamura | 340/721 X |

Primary Examiner—James D. Thomas
Assistant Examiner—Thomas C. Lee

[57] ABSTRACT

A word processing system is provided with separate data structures in system memory (4). One of these, the internal image, contains the calculated graphics image and another the operator's alphanumeric character input. When displaying, the two images are merged together with the annotation overlay effectively overlaying the graphics overlay. In this way, if the operator erases something on the annotation overlay, the contents of the graphics overlay reappear. During the display of the calculated image and as the operator adds annotations to the display, overlaying conflicts between the graphics image and an alphanumeric character added by the operator are resolved in favor of the alphanumeric character. When an overlaying conflict does exist, the alphanumeric character is highlighted by video reversing to indicate that it is hiding a portion of the graphics image.

5 Claims, 4 Drawing Figures

INDEPENDENT IMAGE AND ANNOTATION OVERLAY WITH HIGHLIGHTING OF OVERLAY CONFLICTS

RELATED APPLICATIONS

This application is related to the following concurrently filed applications which are assigned to a common assignee and are incorporated herein by reference:

Application Ser. No. 493,677, filed May 11, 1983, by Danny B. Convis, Donald T. Crehan and Charles J. Lovell and entitled "Internal Image and Bit Array for Display and Printing of Graphics", now U.S. Pat. No. 4,555,700 issued Nov. 26, 1985.

Application Ser. No. 493,578, filed May 11, 1983, by Jerold D. Dwire and Donald T. Crehan and entitled "Display of Graphics Using a Non-All Points Addressable Display", now U.S. Pat. No. 4,556,878 issued Dec. 3, 1985.

FIELD OF THE INVENTION

This invention generally relates to graphics support on a word processor, and more particularly to a procedure which allows the operator to personalize a bar, pie or line chart or similar graphical display with his own titles or legends.

BACKGROUND OF THE INVENTION

Word processing systems have evolved from relatively simple text processors which facilitated the manipulation of character strings to the sophisticated multitasking processors of today which are capable of such diverse applications as communications, calculations and data processing emulations. It is not uncommon, for example, to provide a word processing system with a calculation application to include the generation of graphics data based on calculated or input numerical data. This is because it is often easier to interpret the numerical data when it is presented as a bar, pie or line graph, for example.

The problem arises, however, in the presentation of the graphics data. Generally, the visual display of graphics data on a CRT display has been accomplished with an All Points Addressable (APA) display. Word processing systems typically use a character box or non-APA display. The advantage of the character box display is that it requires much less memory than an APA display of even moderate resolution. The disadvantage in so far as the presentation of graphics data is concerned is the inability of the character box display to support the display of characters not defined by the character box.

Printing the graphics data is another problem because most business level word processing systems employ letter quality printers of the type wherein a fully formed character is imprinted on the paper by a single stroke. Typical of such letter quality printers are printwheel printers. The printwheels on these printers usually have 96 petals, each having a single character. In the past, printing of graphics data has usually been accomplished with a dot matrix printer or a plotter. While the dot matrix printer and the plotter do an excellent job of printing graphics data, neither is an acceptable substitute for the printing of alphanumeric characters. The user of a word processing system has therefore been faced with the requirement of purchasing two printers in order to obtain quality printing of both alphanumeric characters and graphics data. However, the logistics of using two different printers, expecially when the same page is to be imprinted by both, is not at all satisfactory.

The above referenced U.S. Pat. No. 4,555,700 entitled "Internal Image and Bit Array for Diplay and Printing of Graphics" discloses an apparatus which provides a word processing system using a non-APA display and a letter quality printer, both character box devices, with the ability to both display and print graphics data. The invention described in that application provides an internal image and bit array apparatus to contain the data structures necessary and sufficient to both display and print the graphics data. These data structures are (1) output by the process that converts numeric data values into image data and (2) input to the display process and the print process. These are the central mechanisms that makes graphics on a character box device possible.

A problem arises, however, when the operator of the word processing system desires to correct or annotate the displayed image. For example, in a typical application, the operator first enters numeric data and then presses the appropriate key to request that the numeric data be converted into a bar, pie or line chart. As a result, an image of the chart is calculated and displayed to the operator. In many cases the operator would want to annotate the displayed image with titles, notes or other alphanumeric data. Such data would normally be written into internal image and if conflicts arise as a result of superimposition of displayed data, the annotation characters added by the operator are written over the previous data. As a result, if the operator changes his mind and deletes some of the added annotation data, the previous data which was written over is lost and can not be redisplayed.

SUMMARY OF THE INVENTION

It is therefore an object of the invention to provide an apparatus which when used with an internal image and bit array apparatus for the display of graphics on a character box display will prevent destruction of the calculated bar, pie or line chart image while the user annotates titles, notes or the like on top of the displayed image.

It is another object of the invention to allow an operator of a word processing system which has the capability of displaying a calculated image to erase an annotation that partially covered the displayed image and have the underlying calculated image reappear unmodified underneath the operator's notes.

The foregoing objects are accomplished by providing at least two separate overlays or planes in read/write memory (RAM). One of these, the internal image, contains the calculated graphics image and the other the operator's alphanumeric character input. When displaying, the two images are merged together with the annotation overlay effectively overlying the graphics image overlay. In this way, if the operator erases something on the annotation overlay, the contents of the graphics image overlay reappear. During the display of the calculated graphics image and as the operator adds annotations to the display, conflicts between the graphics image and an alphanumeric character added by the operator are resolved in favor of the alphanumeric character. When an overlaying conflict does exist, the alphanumeric character is highlighted by video reversing to indicate that it is hiding a portion of the graphics image.

BRIEF DESCRIPTION OF THE DRAWINGS

The foregoing and other objects, advantages and aspects of the invention will be better understood from the following detailed description of the invention with reference to the accompanying drawings, in which.

DETAILED DESCRIPTION OF THE INVENTION

Figure 1:
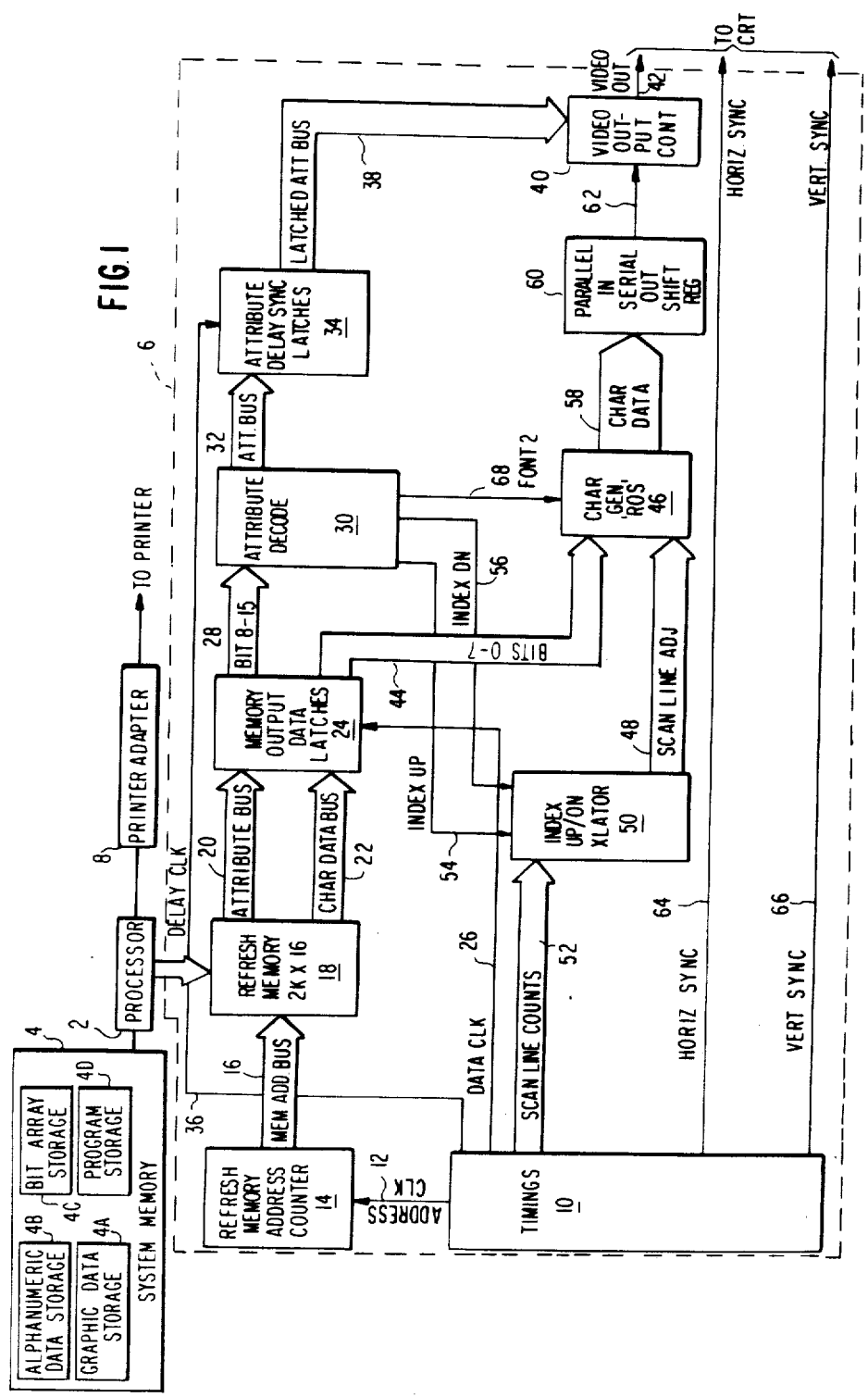
FIG. 1 is a block diagram of a word processing system in which the present invention is embodied.

Referring now to the drawings, and more particularly to FIG. 1, there is shown a block diagram of a typical implementation of a word processor in which the present invention is embodied. The system includes a processor 2, a system memory 4, a display adaptor 6, and a printer adaptor 8. The system memory 4 contains the bit array, the internal image array and the overlay array which are described in more detail hereinafter. Only those connections between processor 2, system memory 4, display adaptor 6 and printer adaptor 8 are shown as needed for purposes of explanation of the invention, all other interconnections therebetween being well understood by those skilled in the art.

In the display adaptor 6, the timings block 10 provides various clocking signals for the word processor display function. The address clock signal on line 12 is input to refresh memory address counter 14 whose output appears on memory address bus 16. The address on bus 16 is input to the refresh memory 18. Attribute bus 20, as well as character data bus 22, are two outputs from refresh memory 18. The data on both buses 20 and 22 are latched into memory output data latches 24. Another clock signal from the timings block 10 is the data block on line 26 which is input to data latches 24 for controlling input thereto. Eight bits on bus 28 are output from latches 24 to attribute decoder 30. Once decoded, attribute data is output on bus 32 and is input to attribute delay synchronization latches 34 under control of delay clock signals on line 36. The output of output control 40 on line 42 is the video input to the CRT display monitor (not shown).

The other eight bits of character data are output from memory output data latches 24 along bus 44 to the character generator ROS 46. The character generator ROS 46 also receives scan line adjustment data on bus 48 from index up or down translator 50 and Font2 on line 68 from attribute decoder 30. The translator 50 receives the scan line count on bus 52 from the timings block 10 and is controlled by signals from attribute decoder 30 on lines 54 and 56 to index up or down in order to provide superscript and subscript functions. The character data output on bus 58 from the character generator ROS 46 is read into a parallel in, serial out shift register 60. The serial character data strings are read out of shift register 60 on line 62 to the video output control 40. The timings block 10 also provides horizontal sync and vertical sync signals on lines 64 and 66 to the display CRT.

Figure 2:
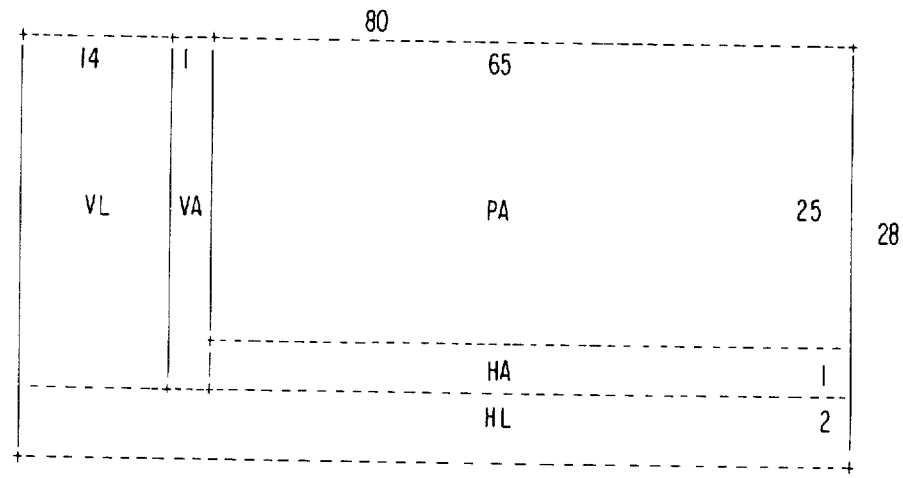
FIG. 2 shows the internal image data structure.
Figure 3:
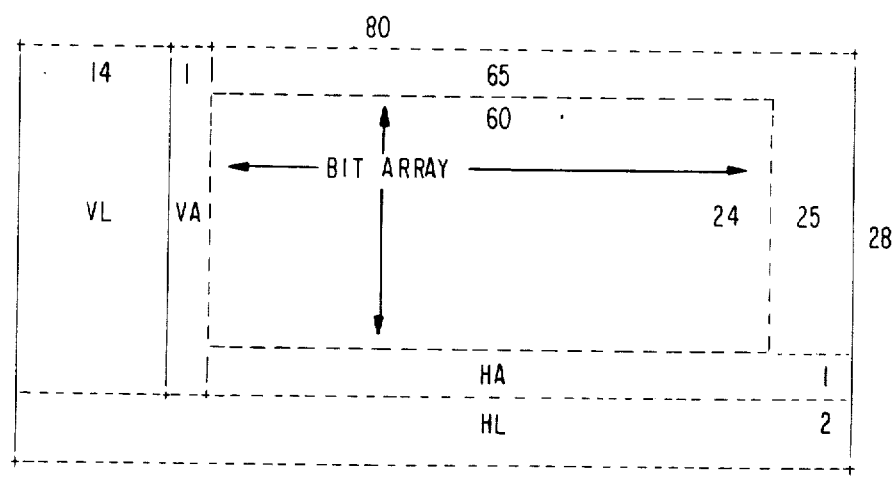
FIG. 3 shows the positional relationship between the internal image data structure and the bit array with the bit array being positioned over the plotting area of the internal image.

The internal image and bit array apparatus of the invention described in U.S. Pat. No. 4,555,700 entitled "Internal Image and Bit Array for Display and Printing of Graphics" will now be described. This apparatus consists of two data structures that are closely linked. The first is the internal image structure. It is shown in FIG. 2 and is a three dimensional matrix. It is 28 character boxes high and 80 character boxes wide, where each box contains two bytes. These two bytes correspond to the fact that each box in the character box display requires a character-attribute byte pair. The second data structure is the bit array data structure and is shown in FIG. 3 and is also a three dimensional matrix. It is 24 character boxes high and 60 character boxes wide, where each character box contains 25 bytes. The 25 bytes contain the 200 dots of the 20×10 print resolution dot matrix of the corresponding character position in the internal image data structure. FIG. 3 shows the positional relationship between the two data structures, the bit array being positioned over the plotting area of the internal image. When it is necessary to display the pie chart, the bit array is scanned and a set of "best dot" glyphs are selected and put in the internal image so as to form a "dot outline" of the pie. The display viewer sees the alphanumeric labels and the dot outline of the pie together on the screen. However, when it is time to print the chart on the printer, the bit array, which contains a high print resolution (1/120 dot/inch) bit map, is combined with the internal image's alphanumeric content to print a high quality product.

The "best dot" selection process as described in U.S. Pat. No. 4,556,878 entitled "Display of Graphics Using a Non-All Points Addressable Display" is used to map the print bit map in the bit array into the character box display for both pie and line charts. It should be understood that the character box display can not possibly show the chart with a resolution comparable to that of the printer. In the character box environment, there are a number of restrictions by virtue of the character box hardware. Specifically, the character box in the display is 16 pels high and 8 pels wide while in the printer, it is effectively 20 pels high and 10 pels wide. In the display there are four characters each containing one dot which when indexed up and down provide eleven possible dot positions within the character box to dot outline the rim and spokes of a pie chart, and there are four characters which when brightened and/or indexed up or down provide twenty glyphs to outline the segments of lines in a line chart. For both the pie chart and the line chart, the circle and straight line segments are drawn into a print resolution bit map that corresponds to the central plotting area of the chart. This print resolution bit map is used when printing so that the image is printed in high resolution. The bit map is 60 character box cells wide (600 pels) and 24 character box cells high (480 pels). Each 20×10 cell of that plotting area corresponds to a character box on the display and is examined to determine which of the eleven pie characters or which of the five line characters is the "best dot" to represent the fragment of circle or line passing through that 20×10 area of the bit map. In the case of the pie chart, eleven zones (each 20×10 in size) are defined, and a bit mask is defined for each of the eleven zones. Then the cell containing the fragment is logically ANDed with each of the eleven masks in a priority order. The central zone is first, the zones immediately above and below it are next, and so on. The first logical AND of the cell with a mask that produces a non-zero result indicates that the circle or line fragment in the cell is intersecting that zone. Then that one of the eleven glyphs that corresponds to that zone is placed in the internal image array as the "best dot" to represent that fragment. The line chart is handled similarly, there being five zones and five masks since there are five glyphs effectively for each of the four line types. A more detailed description of this process is contained in U.S. Pat. No. 4,556,878 entitled "Display of Graphs Using a Non-All Points Addressable Display".

Figure 4:
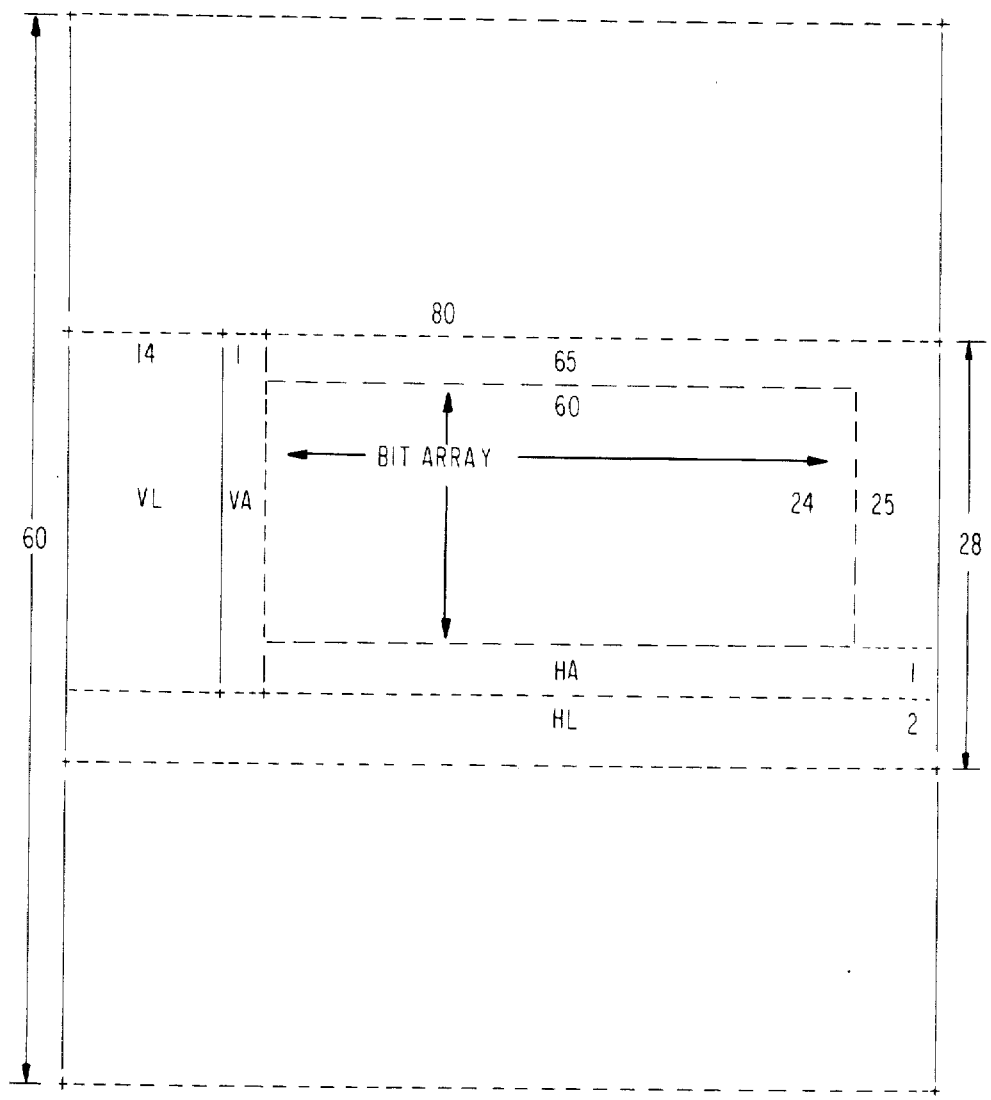
FIG. 4 shows the annotation overlay image data structure in which the annotation data is entered.

According to the present invention, the internal image array is used to store the calculated image data and a separate annotation overlay image array is used to store the annotation data generated by the user. The overlay data structure is shown in FIG. 4 and it too is a three dimensional matrix being 60 character boxes high and 80 character boxes wide, where each box contains two bytes. In other words, the overlay data structure is a full page in size which allows the user to make annotations outside the plotting area of the internal image and indeed outside the internal image itself. FIG. 4 shows the positional relationship of the three data structures, the bit array being positioned over the plotting area of the internal image and the internal image being positioned in the middle of the annotation overlay array. It will of course be understood that this illustration shows the conceptual relationship of these three data structures and that each data structure occupies a separate volume in the system memory 4. When displayed to the user, these two arrays or overlays are "merged" together and presented on the display screen. This "merging" effectively has the annotation overlay "on top" of the image overlay by using the following truth table for each cell in deciding what actually goes to the screen that the user sees:

| Contents of Image Overlay | Contents of Annotation Overlay | Result Shown on Display |
|---|---|---|
| blank | blank | blank |
| blank | non-blank | contents of annotation overlay |
| non-blank | blank | contents of image overlay |
| non-blank | non-blank | contents of annotation overlay |

As the user erases something on the annotation overlay, the contents of the image overlay reappear beneath it, unharmed by his trial-and-error annotation work.

From the foregoing truth table, the last combination indicates a conflict between the annotation overlay and the image overlay and, as indicated, this conflict is always resolved in favor of the annotation overlay. However, the combination of two non-blank conditions is detected and the "reverse video" bit in the attribute byte for that character is turned on so that the character which is displayed from the annotation overlay is highlighted by video reversing to indicate that this character is hiding a portion of the chart.

The process of merging the internal image and annotation overlays for display was implemented using a Program Design Language (PDL). An understanding of PDL may be had with reference to an article entitled "Top-down Development Using a Program Design Language" by P. Van Leer, *IBM Systems Journal*, vol. 15, no. 2, (1976) pp. 155-170. The PDL implementation is set forth below:

```
*                    MERGE ANNOTATION OVERLAY ARRAY AND
                     INTERNAL IMAGE ARRAY FOR DISPLAY
                     WITH HIGHLIGHTING
*                    BEGIN MERGE
BEGIN MERGE
*                    1. SET CONSTANTS
       OOS=16          OVERLAY OFFSET FROM TOP OF OVERLAY
                       ARRAY TO TOP OF INTERNAL IMAGE
                       ARRAY
       IIH=28          INTERNAL IMAGE HEIGHT (LINES)
*                    1. WHILE I=1 TO HEIGHT OVERLAY ARRAY
                       (LINES) DO
       DO I=1 TO OLH
*                    2. . WHILE J=1 TO WIDTH OVERLAY ARRAY
                       (CHARS) DO
       DO J=1 TO OLW
*                    3. . . IF CURRENT ROW BEFORE THE START OF
                       THE CENTERED INTERNAL IMAGE ARRAY
                       OR AFTER END OF IT, THEN
       IF I<=OOS OR I>OOS+IIH THEN
*      OA(I,J,1)=OL- 3. . . SET OUTPUT ARRAY TO JUST CONTENTS
       (I,J,1)
       OF OVERLAY
       ARRAY
           OA(I,J,1)=OL(I,J,1)                CHARACTER BYTE
           OA(I,J,2)=OL(I,J,2) OR HIGHLIGHT   ATTRIBUTE BYTE
                                              PLUS HIGHLIGHT
                                              'OR' HIGHLIGHT
                                              BIT ON
*                    3. . . ELSE (COMBINE INTERNAL IMAGE AND
                       OVERLAY ARRAYS)
       ELSE
*                    3. . . CALC ROW INDEX OF II
       IROW=I-OOS
*                    3. . . CLAC COL INDEX OF II
       ICOL=J
*                    3. . . IF II(IROW,ICOL) DOES NOT HAVE
                       SOMETHING IN IT ALREADY, THEN
       IF II(IROW,ICOL)=BLANK THEN
*                    3. . . SET OUTPUT ARRAY TO JUST CONTENTS
```

```
                    OF CORRESPONDING INTERNAL IMAGE
                    CELL
     OA(I,J,1)=II(IROW,ICOL,1)        CHARACTER BYTE
     OA(I,J,2)=II(IROW,ICOL,2)        ATTRIBUTE BYTE
                 3... ELSE (CONFLICT)
         ELSE
                 3... SET OUTPUT ARRAY TO JUST CONTENTS
                      OF OVERLAY ARRAY (RESOLVE IN
                      FAVOR OF ANNOTATION OVERLAY)
     OA(I,J,1)=OL(I,J,1)              CHARACTER BYTE
     OA(I,J,2)=OL(I,J,2) OR HIGHLIGHT ATTRIBUTE BYTE
                                      PLUS HIGHLIGHT
                                      'OR'HIGHLIGHT
                                      BIT ON
                 3... ENDIF
         ENDIF
                 3... ENDIF
         ENDIF
                 2.. ENDDO
         ENDDO
                 1. ENDDO
         ENDDO
                 END MERGE
 END MERGE
```

Essentially the same process is used to print the data except that the graphics data is taken from the bit array and "merged" with overlay array and the resulting data stream is supplied to the printer adaptor 8. Using the same truth table, but substituting "bit array" for the "image overlay", any conflict between the graphics data in the bit array and the alphanumeric character data in the annotation overlay is resolved in favor of the latter.

By using the annotation overlay shown in FIG. 4 for storing the alphanumeric character data generated by the user to annotate a graphics display, the calculated graphics character data in the internal image array is protected from being erased in the event that an annotation is "written over" the displayed graphics data. As a result, the user is given the ability to erase the annotation and have the hidden graphics display reappear. Furthermore, the user can see from the display that part of the graphics display is hidden by an annotation due to the fact that the character or characters involved are displayed in reverse video. While the preferred embodiment of the invention does not contemplate a direct counterpart to this last feature in the printing function, a similar effect could be produced with a printer having a multicolor printing capability.

We claim:

1. A word processing system having an interactive display terminal for displaying alphanumeric and calculated graphic images while maintaining the integrity of the calculated graphic data comprising:

first storage means for storing data representative of calculated graphic data;

second storage means for storing alphanumeric character data entered by a user;

merging means connected to said first and second storage means for merging the data in said first and second storage means for display on said display terminal;

detecting means in said merging means for detecting overlaying conflicts between the merged data by resolving said overlaying conflicts in favor of the data from said second storage means while preserving the data in said first storage means, whereby erasure of conflicting data in said second storage means results in the display of data from said first storage means previously in overlaying conflict with data erased from said second storage means, said detecting means providing an output indicating an overlaying conflict between the data in said first and second storage means; and means responsive to said detecting means output for causing the corresponding data from said second storage means to be highlighted in its display on said display terminal.

2. The word processing system according to claim 1 wherein said word processing system further includes a printer, at least said display terminal being a character box device, said word processing system further comprising:

third storage means for storing data representative of high resolution printed graphics in the form of a bit array;

calculating means connected to said third storge means for calculating the data in said first storage means at a lower resolution compatible with said character box device from the data in said third storage means;

second merging means connected to said second and third storage means for merging the data in said second and third storage means to produce a printer data stream; and second detecting means in said second merging means for detecting any overlaying conflicts between the data and resolving detected overlaying conflicts in favor of the data in said second storage means.

3. A method of displaying images of alphanumeric data entered by a user and calculated graphic data on a display terminal while maintaining the integrity of the claculated graphic data comprising the steps of:

storing said calculated graphic data;

storing said alphanumeric character data as it is entered by a user;

merging the stored calculated graphic data with the stored alphanumeric character data;

detecting overlaying conflicts between the calculated graphic data and the stored alphanumeric character data merged in said merging step;

displaying images of the merged calculated graphic data and alphanumeric character data while resolving detected overlaying conflicts between said calculated graphic data and said alphanumeric character data in favor of said alphanumeric character data for purposes of displaying said images;

if conflicting alphanumeric character data is erased, then displaying the calculated graphic data image;

detecting during said merging step overlaying conflicts between said calculated graphic data and said alphanumeric character data; and highlighting the displayed alphanumeric character data detected to conflict with stored calculated graphic data to show the user where an overlaying conflict exists.

4. The method according to claim 3 wherein the step of displaying is performed on a character box display device and wherein the step of storing said calculated graphic data is performed by storing said calculated graphic data in high resolution in the form of a bit array and further comprising the step of deriving a lower resolution version of said calculated graphic data which is compatible with said character box display device, said lower resolution version being merged with said alphanumeric character data in said merging step.

5. The method according to claim 4 further comprising the steps of:

merging said stored alphanumeric character data with the data in said bit array to generate a printer data stream by resolving overlaying conflicts between said stored alphanumeric character data with the data in said bit array in favor of said alphanumeric character data; and printing images of the merged alphanumeric character data and the data in said bit array.

* * * * *

UNITED STATES PATENT AND TRADEMARK OFFICE
CERTIFICATE OF CORRECTION

PATENT NO. : 4,616,336

DATED : October 7, 1986

INVENTOR(S) : D. B. Robertson et al

It is certified that error appears in the above—identified patent and that said Letters Patent is hereby corrected as shown below:

Col. 6, lines 57-60,

"*   OA(I,J,1)=OL-   3. . .SET OUTPUT ARRAY TO JUST CONTENTS
    (I,J,1)
        OF OVERLAY
  ARRAY"

should read

--*                  3. . .SET OUTPUT ARRAY TO JUST CONTENTS
                            OF OVERLAY ARRAY--

Col. 8, line 40, "storge" should read --storage--.

Signed and Sealed this

Twenty-seventh Day of January, 1987

Attest:

DONALD J. QUIGG

Attesting Officer          Commissioner of Patents and Trademarks